Jan. 21, 1964 P. B. HASSELQUIST ET AL 3,118,303
WIND TUNNEL
Filed Nov. 17, 1960 4 Sheets-Sheet 2

INVENTORS
PAUL B. HASSELQUIST
GEORGE A. ESTEL JR.
BY
Williamson + Palmatier
ATTORNEYS Jan. 21, 1964    P. B. HASSELQUIST ET AL    3,118,303
WIND TUNNEL
Filed Nov. 17, 1960    4 Sheets-Sheet 4

INVENTORS
PAUL B. HASSELQUIST
GEORGE A. ESTEL JR.
BY
*Williamson + Palmatier*
ATTORNEYS

United States Patent Office 3,118,303
Patented Jan. 21, 1964

3,118,303
WIND TUNNEL
Paul B. Hasselquist, Minneapolis, and George A. Estel,
Jr., Hopkins, Minn., assignors to FluiDyne Engineering
Corporation, Minneapolis, Minn., a corporation of
Minnesota
Filed Nov. 17, 1960, Ser. No. 69,969
35 Claims. (Cl. 73—147)

This invention relates to wind tunnels and particularly to hypersonic wind tunnels adapted to simulate on a model insofar as possible the flow patterns, pressures, temperatures, and forces of free flight.

Hypersonic wind tunnels in general operate at Mach numbers above 5.0 and below 20, at the present time, although there is no accepted precise definition of the hypersonic range. In order to simulate these high Mach number flight conditions, the wind tunnel or test facility must operate at extremely high pressures and temperatures, with pressures up to 3000 pounds per square inch and temperatures between 1200 and 3600° F. being presently employed with higher temperatures and pressures expected in the future. The tremendous pressures and temperatures which must necessarily be employed in these hypersonic type wind tunnels create many serious problems in their conception and design, some of the most important of which relate directly to the means for supporting and moving the model being tested, since these high temperatures and pressures tend to materially interfere with the mechanical functioning of the model supporting and motivating mechanism so as to cause rapid deterioration and malfunctioning of mechanical joints and moving parts if they are disposed in the jet stream, and pose particular difficulties in providing suitable means for cooling these mechanical joints and other structure associated therewith.

In conventional types of wind tunnels presently available, the model supporting mechanism and mounted model are normally permanently or fixedly disposed in the path of the jet air stream with no provision for moving the mounted model into and out of said air stream, and as a result the model and supporting mechanism are present in the air stream during the entire time that the run is on which is extremely undesirable, particularly in hypersonic type wind tunnels.

Thus, in conventional wind tunnels the model is in the air stream before flow is stabilized, and the supporting mechanism is subjected to the tremendous temperatures and pressures characteristic of these tunnels. This makes design and construction exceedingly difficult and expensive, shortens the life of the mechanism, causes frequent malfunctioning and difficulty of operation of any mechanical joints in the path of the air stream and makes it hard to cool the equipment and instrumentation necessary to record the test data.

Many of the conventional wind tunnels also provide hazardous and undesirable working conditions. The plenum chambers which enclose the test area are often difficult to clear of heat and gas following a test run, and the operators must either enter the plenum chamber and encounter these undesirable conditions within the chamber to attend and service the models shortly after a run is made, which is usually the most desirable course of action, or they must wait an undesirably long time until the chamber has been cleared before entering.

In addition, the permanent fixed position of the mounted model and supporting mechanism therefor in the direct path of the air stream presents serious hazards to the operator attending the mounted model, who must likewise be in the path of the air stream. If the system should malfunction upstream or if the air stream should be accidentally or inadvertently turned on while the operator is so positioned in the path of travel of the air stream, it is apparent that serious injury and very likely death will occur.

Therefore, an important object of our invention is a novel type of wind tunnel particularly suited for hypersonic and/or heated testing of models which provides maximum efficiency of operation in the testing of the models, results in longer life of the model supporting mechanism, permits more accurate readings and a greater variety of surveys and generally eliminates most of the disadvantages presently associated with wind tunnels presently available.

Still another object is a novel type wind tunnel of the class described in which the model can be held out of the air stream until the flow thereof is stabilized after which the model may be injected into the stream in any position or angle desired.

Still another object is a novel wind tunnel in which the attitude or angle of attack of the model may be selectively varied while in the air stream by supporting mechanism in which the relatively movable portions which accomplish the change in attitude of the model are located outside the path of the air stream.

Still another object is a novel wind tunnel of the class described in which the model being tested may be selectively rotated about a range of points extending either longitudinally or transversely of the air stream to vary the attitude or angle of attack of the model as desired to enable almost any desired test or survey to be performed.

Still another object is a wind tunnel of the class described in which the model may be selectively moved transversely and longitudinally through the air stream so that surveys or readings may be taken across and lengthwise of the stream at any particular point desired in the flow pattern of the air stream by selectively moving and positioning the model therein.

Still another important object of our invention is a wind tunnel of the class described in which the model supporting means are so designed that all of the mechanical joints for changing the angle of attack and the relative position of the model with respect to the air stream are located out of the air stream and in places where cooling is relatively easy.

Still another object is a novel wind tunnel providing model supporting mechanism which permits changing of both the yaw angle and the pitch angle of said model or combinations of both while in said air stream.

A still further object is a novel wind tunnel of the class described which is extremely compact and can be housed in a relatively small chamber.

Still another object is a novel wind tunnel of the class described in which the instrumentation for recording the data and various surveys involved in the test may be located at a point relatively close to the model and yet out of the path of the air stream so as not to be damaged thereby or to complicate or make expensive the cost of installing and shielding or protecting such instrumentation as in conventional models in which the instrumentation is normally necessarily located directly in or near the path of the air stream.

Still another and a very important object is a novel model testing wind tunnel of the class described which provides ready access to the model in a manner considerably more convenient and less hazardous than wind tunnels presently available.

A still further object is a novel wind tunnel of the class described in which the model is not only easy of access but also may be moved entirely out of the path of the air stream and out of the plenum chamber entirely so as to eliminate the hazards and undesirable conditions normally associated with entering and working in the interior of the chamber immediately following a test run and requiring the operator to stand directly in the path of the air stream and eliminates the necessity for expensive auxiliary equipment suitable for exhausting said chamber.

Still another object is a wind tunnel of the class described in which the attitude of the model can be changed in the air stream and in which the model can be readily observed or photographed from above and from the side while in said air stream with a minimum of interference.

A further object is novel model support mechanism which provides for maintaining the model in the air stream, moving it into and out of the air stream, and changing its angle of attack with a minimum of interference to and disruption of the flow pattern of said air stream.

Still another object is to provide a novel plenum for a wind tunnel assembly which consists of separable sections which can be quickly moved apart a considerable distance to quickly exhaust the plenum chamber, and novel clamping means for quickly locking and unlocking said sections.

These and other objects and advantages of our invention will more fully appear from the following description made in connection with the accompanying drawings wherein like reference characters refer to the same or similar parts throughout the several views, and in which.

Reference is now made to the accompanying drawings for a more detailed description of the preferred embodiments of our invention shown therein.

Figures 1, 9, 10, 14:
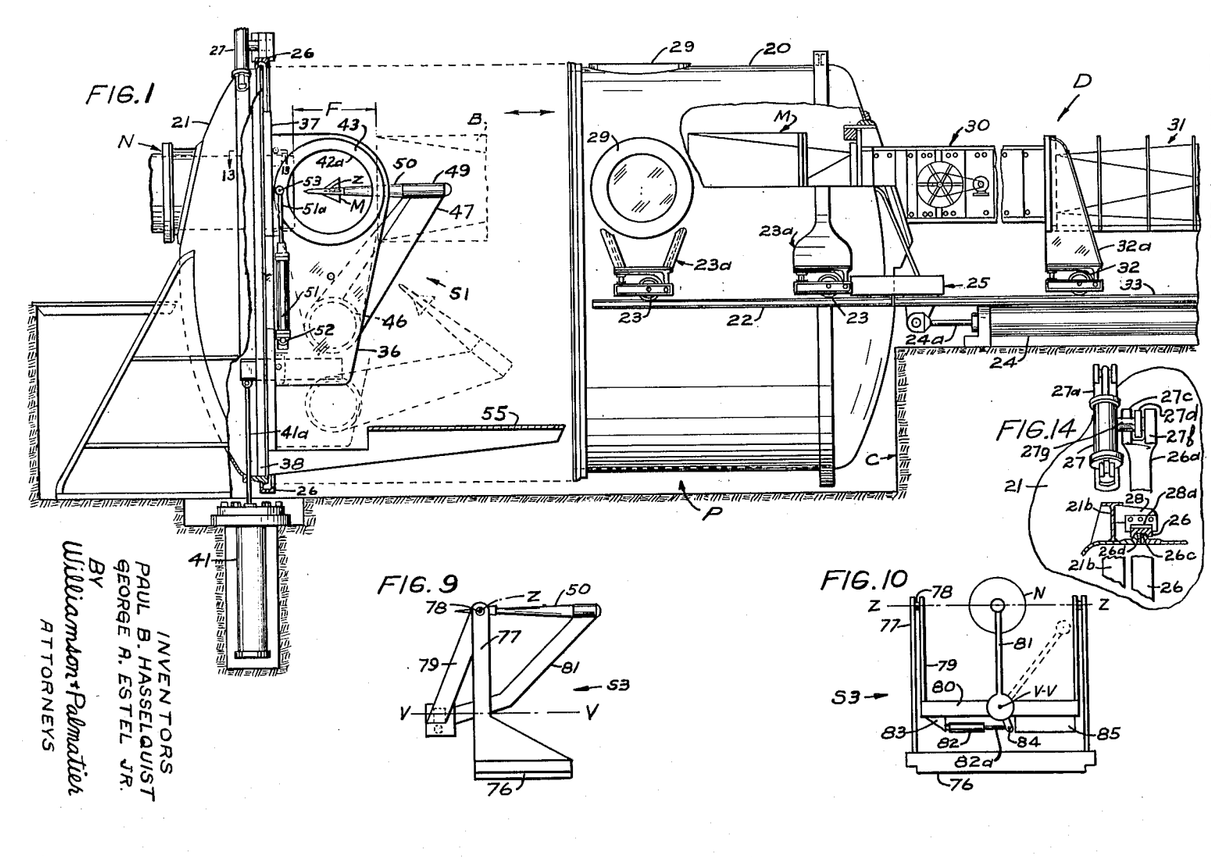
FIG. 1 is a side elevational view with portions broken away of one assembly employing a separable sectional plenum chamber with the chamber open and one form of model supporting means of our invention in raised operational position.
FIGS. 9 and 10 are somewhat diagrammatic side and front elevational views respectively of another alternate form of model supporting mechanism of our invention.
FIG. 14 is an enlarged detail view, partly in section, of the chamber clamping mechanism of FIG. 1.

Referring first to FIG. 1, the wind tunnel assembly shown therein consists of a cylindrical sectional plenum shell P providing a suitable plenum or test chamber therewithin, the cylindrical shell P having a movable down stream plenum section 20 and a stationary upstream plenum section 21. The movable down stream section 20 is mounted for mobile travel on and between suitable rail members 22 disposed on each side of the movable section and rides back and forth thereon by means of suitable wheels or rollers 23 attached to the movable section 20 by suitable supporting structure 23a, the movable section 20 being adapted for axial reciprocation to open and close the test chamber. This reciprocating movement is provided by any suitable actuating means such as the plenum actuating cylinder 24 and its connecting rod 24a, the outer end of which is drivingly connected to a mounting bracket 25 carried by the outer end portion of the movable plenum section 20. Depending on the particular installation involved, the lower portion of the plenum in many instances may be disposed in a cavity C in the ground beneath the main floor of the building enclosing said wind tunnel, or if big enough it may extend upwardly through several stories with suitable flooring provided at various levels with respect to the height of the plenum shell in order to make all parts thereof readily accessible.

Figures 2, 5, 7, 8:
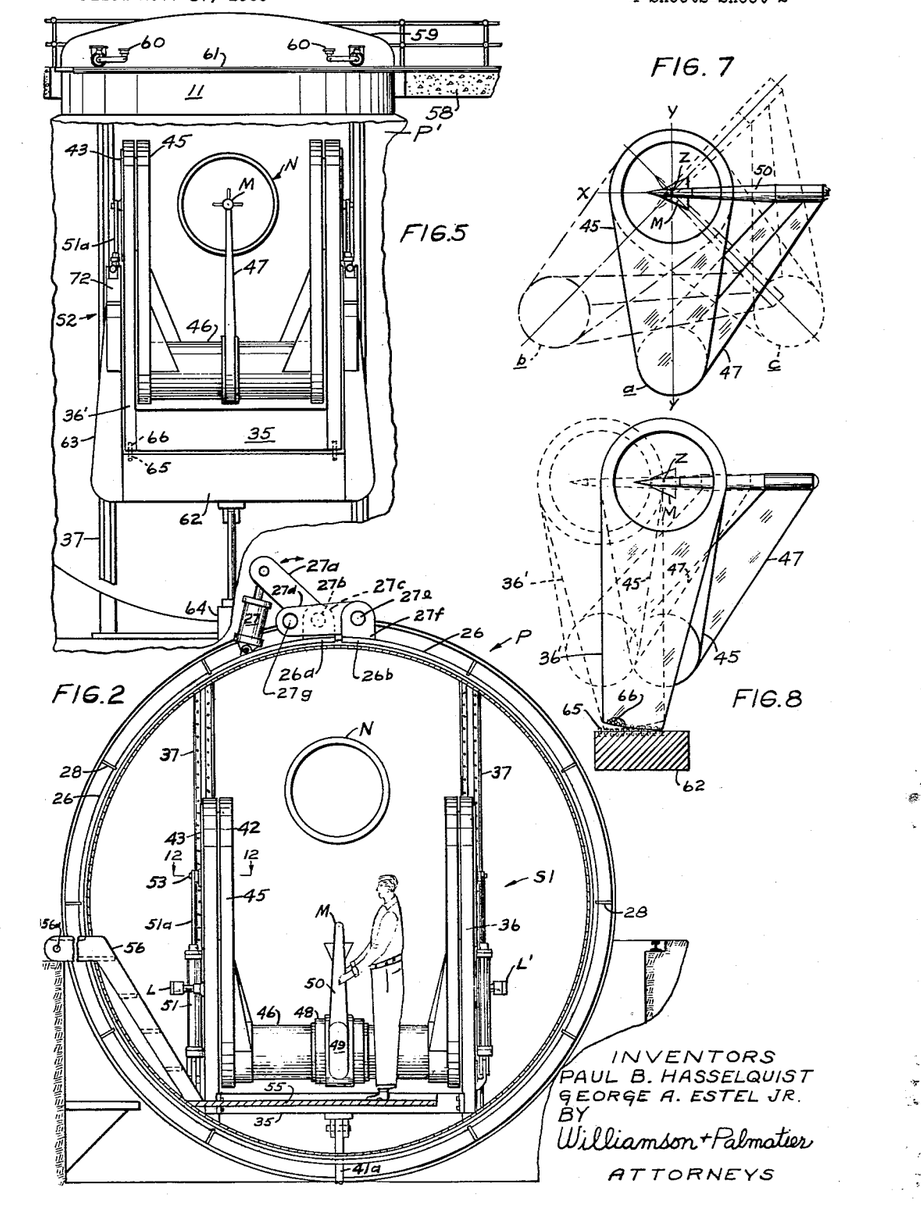
FIG. 2 is a front view of the model support mechanism of FIG. 1 taken along the lines 2—2 of FIG. 3 with said supporting mechanism in lowered retracted position.
FIG. 5 is a broken vertical cross sectional view taken along the lines 5—5 of FIG. 4 with the hatch cover in closed position.
FIG. 7 is a somewhat diagrammatic side elevational view on an enlarged scale of a portion of the model supporting means of FIGS. 1 to 3 inclusive illustrating the relative positions of the model and supporting mechanism when the model is at some of the different pitch positions capable of being assumed by the model.
FIG. 8 is a somewhat diagrammatic side elevational view on an enlarged scale of a portion of the model supporting means of FIGS. 4 to 6 inclusive illustrating the longitudinal axial translation of movement of the model in the air stream.
Figure 3:
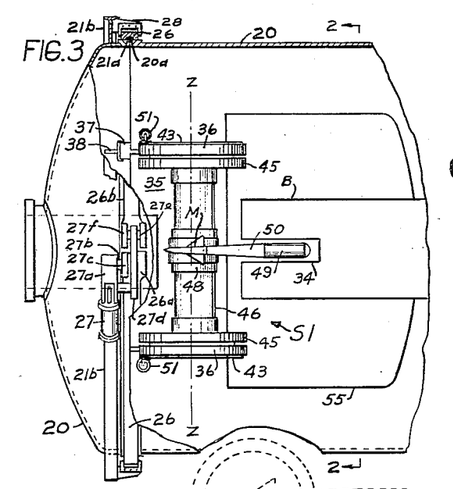
FIG. 3 is a partial top plan of the assembly of FIG. 1 when closed, with portions broken away.

The two sections 20 and 21 of the plenum must be tightly locked or clamped together in operational position by suitable means. The preferred clamping means shown in the drawings includes a clamping band 26 which encircles the joint between the abutting outwardly flaring lips 20a and 21a of the respective movable and stationary plenum sections and is adapted to be expanded or contracted to respectively unlock or lock the plenum sections by over-center actuating means. This clamp actuating means is best seen in FIGS. 2, 3 and 14, and comprises a clamp actuating cylinder 27, the lower end of which is pivotally anchored to the top of the stationary section 21. The connecting rod of the cylinder is pivotally connected to a generally upstanding actuating arm 27a which is pivotally anchored at its lower end to one free end 26a of the clamping band by means of pivot pin 27b and its supporting lug 27c carried by end 26a of the band. The arm 27a is also linked to the other free end 26b of the clamping band by means of an elongate link member 27d which is carried and pivotally supported on the other free band end 26b by a pivot pin 27e supported by upstanding lugs 27f which are mounted on free end 26b. The forward end of link 27d and actuating arm 27a are interconnected by means of pivot pin 27g which extends therebetween and to which arm 27a and link 27d are each pivotally attached. Thus, as the actuating arm 27a is swung towards the cylinder 27 by contraction of the cylinder's connecting rod, the pin 27g is also swung towards the cylinder about pin 27b, the pins 27g and 27b working against each other to draw the free ends of the clamping band together, thereby contracting the band and locking together the plenum sections by the over-center action of the actuating arm, the clamping mechanism being shown in locked position in FIGS. 2, 3 and 14. Conversely, extension of the connecting rod swings the actuating arm away from the cylinder and the pin 27g away from the cylinder (or clockwise about pin 27b as viewed in FIG. 2), thereby moving the free ends of the clamping band away from each other and expanding the band away from and clear of the abutting lips of the plenum sections. To guide the expanding and contracting movements of the band towards and away from the plenum and maintain it in proper alignment therewith, a series of circumferentially spaced overhanging guide shoes 28 are mounted on a plenum encircling re-enforcing T-rib 21b carried by the plenum section 21, the shoes having downwardly facing band receiving channels 28a which guide the movements of the band, as best seen in FIG. 14. The inner face of the band is provided with a downwardly facing circumferential recess or groove 26c which receives the abutting flaring lips of the plenum sections and holds them together. One of the lip portions is preferably provided with a suitable sealing strip 21d to seal the interface between the abutting lips of the sections. Suitable enclosed observation ports or windows 29 are disposed around the upper periphery of the movable plenum section to enable the model to be easily viewed and photographed while in the air stream during testing, a pair of the ports being disposed directly opposite to each other on opposite sides of the plenum section 20 and another port being disposed thereatop for looking directly down on the model. The center of the ports are in substantial alignment with the longitudinal center line of the air stream and are substantially concentric with the model when it is in test position in the air stream.

The stationary section 21 of the plenum is provided with a jet nozzle N which extends longitudinally into the interior of the plenum chamber and is connected exteriorly of the plenum to any suitable source or means of supplying a stream of air having the speeds, temperatures, and pressures desired. Since the source of the air stream does not per se constitute a part of this invention the specific means for supplying same are not shown in the drawings. A bell mouth B or diffuser pickup is provided interiorly of the tank or plenum chamber and is carried by the movable section 20 thereof and is adapted to be disposed in operational position in aligned horizontally spaced apart relationship with respect to the inner or discharge end of the nozzle N, the area between the opposing ends of the nozzle and bell mouth constituting a free jet area F. The bell mouth communicates down stream with an elongate telescopic type supersonic diffuser D, a portion of which is shown in the drawings including a variable diffuser portion 30 and a fixed diffuser portion 31 having telescoping sections and which is mobilely supported by wheels or rollers 32 carried by the mobile diffuser support structure 32a which ride on the diffuser transport rails 33 for corresponding reciprocating movement of the diffuser with the plenum chamber. The diffuser D in turn is connected to a subsonic diffuser section (not shown) and/or suitable cooling mechanism (not shown) which do not constitute per se a portion of this invention and therefore further details thereon are not supplied as being unnecessary to the description and understanding of this invention.

The bell mouth B is provided with a pair of vertically aligned longitudinally extending cut-out slots or openings 34 in the top and bottom wall portions thereof and which communicate with the inner marginal edge of the bell mouth to permit the free obstructed vertical movement of the model therethrough.

The plenum chamber has disposed interiorly thereof novel model support mechanism for carrying the model and controlling the movements thereof. FIGS. 1 through 3 illustrate one form of model supporting mechanism S1 according to this invention. This model support mechanism S1 of FIGS. 1 to 3 includes a vertically movable swing supporting unit which includes a horizontal laterally disposed supporting base member 35 which spans the air stream and joins together at their lower ends a pair of vertical upstanding bearing support members 36 disposed outside the air stream on opposite sides thereof. A pair of laterally spaced vertically disposed channel type rail or guide members 37 are provided in substantial alignment with the inner marginal edge of the stationary plenum section 21, the rails being mounted on vertical supports 38. The vertical bearing support members 36 are mounted for guided vertical travel on the guide rails 37 by means of slide or runner members 39 of T-shaped cross section, which runners 39 are carried by each of the supports 36 at the upper and lower ends thereof and extend rearwardly therefrom, the enlarged head or runner portion being disposed within the guide channel of the rails for free sliding vertical movement with respect thereto, the shank portion extending forwardly from the rail through suitable vertical slots provided in the face of the rails and secured to the rear edge portion of the supports 36 by means of the fastener 40. The rails may have an open center portion dividing the rails into upper and lower rail sections for a purpose hereinafter to be described. This swing supporting unit is vertically reciprocated by means of a model support actuating cylinder 41 and its connecting rod 41a, the upper end of which is connected to the rear end portion of the base 35.

The upper end portion of each of the bearing supports 36 is provided with a large circular opening 36a in which a large annular cylindrical pivot member or swing bearing 42 is rotatably and concentrically journaled, the bearings having large open centers 42a so that the model being tested can be viewed through the openings. The bearings 42 extend through the entire thickness of the bearing supports 36 and have secured to their outer ends a large annular flange 43 for turning the bearing, which flange overlies the outside face of the bearing supports 36. The annular swing bearings 42 ride on anti-friction bearing units 44 disposed between the bearings 42 and the bearing supports 36. Each of the swing bearings has integrally connected to the inner end thereof a depending swing arm or strut 45 having a large viewing opening 45a concentric with the openings in the swing bearings. The arms 45 in turn are interconnected and joined together at their lower ends by means of a swing seat comprising a cylindrical tube 46 which also spans the air stream and which is adapted to house therewithin various necessary instrumentation such as pressure transducers and other instruments and which can be readily cooled if desired. The cylindrical seat 46 has mounted thereon and serves as a support for a thin forwardly and upwardly inclined model support strut member 47 which is clamped or secured to the center portion of the cylinder 46 by means of a removable clamping collar 48 which may also be loosened to permit the strut 47 to be rotated relative to the cylinder 46.

The strut 47 has mounted on the upper end thereof a socket 49 on which is mounted the rearwardly extending elongate sting or roll mechanism 50, the sting having mounted on the rear end thereof the model M to be tested. The strut is so positioned and adjusted on the cylinder 46 that the model M which it carries is centrally positioned in alignment with the center of the swing bearing openings on the axis of rotation of said bearings whereby the model and bearings are rotated about a common horizontal axis normal to the air stream in order to vary the pitch of the model with respect to the direction of travel of said air stream.

Thus, the bearings 42, arms 45 and cylindrical tube 46 all swing or rotate about a common axis Z corresponding to the center or axis of the bearings at the intersection of the centerlines X and Y (see FIG. 7), said swinging or rotatable movement of the swing unit comprising said bearings, arms and tube effecting corresponding simultaneous pivotal movement of the model about this same axis (sometimes referred to as the pitch axis) to selectively vary the pitch of the model in the air stream.

To accomplish this simultaneous rotation of the swing unit and model about the bearing or pitch axis, vertically disposed angle of attack cylinders 51 are provided on each side of the supporting unit. The lower end of each cylinder is pivotally secured to its respective bearing support 36 for pivotal movement about a horizontal transverse axis as provided by the pivot pin 52. The upper end of the cylinder connecting rod 51a is pivotally secured to the annular bearing flange 43 by means of the pivot pin 53 so that reciprocation of the connecting rods 51a effects a torque producing or turning force on the annular flanges 43 to cause rotation thereof in one direction or the other, either clockwise or counterclockwise, which rotational movement causes corresponding rotational movement of the swing bearings and pitching of the model about the bearing axis. The cylinders may be overlain or enclosed by a heat shroud (not shown) so that the cylinders are disposed between a heat shroud and their respective bearing supports 36.

A platform 55 is also provided interiorly of the plenum chamber and beneath the model supporting mechanism to enable an operator or attendant to stand beside the model and its supporting mechanism when it is in retracted lowered position as shown by the broken line position of FIG. 1. The entire assembly is so designed that when the operator is standing on the platform 55 and attending to the model, the operator's head and entire body will be disposed beneath the path of the air stream. A ladder 56 is provided to enable the operator to step down into the plenum chamber from the ground or floor level and onto the platform 55 when the plenum sections have been separated and the plenum chamber is opened as in FIG. 1. The ladder 56 may be hingedly mounted at its upper end as at 56a to permit the ladder to be swung upwardly and positioned outside the plenum chamber when the chamber is closed.

In the operation of the wind tunnel assembly and model mounting mechanism S1 shown in FIGS. 1 through 3 inclusive, the plenum chamber is first opened so that the plenum sections are as shown in FIG. 1, and the model supporting mechanism is positioned at the bottom of its travel as represented by the broken line position of FIG. 1 and the model M is mounted on the sting or roll mechanism. In the broken line position of FIG. 1, the strut 47 has been swung or rotated forwardly relative to the swing seat or tube 46, to facilitate the mounting or servicing of the model. When the model has been properly mounted, the strut 47 is swung upwardly about tube 46 to its normal inclined position shown by the solid line position of FIG. 1 with the model located on the bearing or pitch axis, the movable plenum section 20 is moved towards and against the stationary section 21 by means of the plenum actuating cylinder 24, and the two sections are locked together by the clamping band 26 which is drawn into clamping engagement with the flaring lips of the plenum sections by retraction of the cylinder 27. The sealed plenum chamber is evacuated by vacuum pumps and the test run is then started. High pressure, high temperature air which has been accelerated to the desired Mach number is channeled through the nozzle N and discharged therefrom into the test chamber and passes down stream from the nozzle through the free jet area F and into the bell mouth B from whence it passes to the diffuser D which converts velocity energy to pressure energy. After the air stream has reached stable flow conditions, the entire model supporting mechanism S1 and the model itself are raised by means of the model supporting actuating cylinder 41 so that the model is injected into the air stream generally transversely thereof. The model may be injected into the air stream in horizontal position (zero pitch) or it may be injected into the air stream at any pitch angle desired or the pitch may be changed while it is in the air stream, the pitch of the model being controlled by selective actuation of the angle of attack cylinders 51 which turn the swing bearings and simultaneously the model in the direction desired, with the entire swing unit swinging or rotating about the bearing or pitch axis.

The model supporting mechanism S1 may also be provided with a vertical position lock L mounted on the rear marginal edge of the bearing support 36 which rides in the open space between the upper and lower rail sections and adapted to prevent vertical movement of the model supporting mechanism when desired. A pitch angle lock L' carried on the outer face of the bearing support 36 may also be provided for preventing movement of the swing unit and fixing the model at zero pitch when desired.

The various pitch angles which the model may assume or be moved to in the course of testing the same is diagrammatically illustrated in FIG. 7. The solid line position $a$ shows the model with its longitudinal axis lying in a horizontal plane at zero pitch with the swing arms 45 and the instrumentation tube 46 disposed vertically directly therebelow. By actuating the angle of attack cylinders 51 and causing their connecting rods 51a to move upwardly, the swing bearings and the swing unit are rotated in a clockwise direction (as viewed in FIG. 1) causing the arms 45 and tube 46 to also swing clockwise and rearwardly about the pitch axis to assume the broken line position $b$ in FIG. 7 and causing the model M to also pivot about the pitch axis to assume an upwardly inclined pitch angle when facing upstream. On the other hand, if the connecting rods 51a are retracted or pulled downwardly (as viewed in FIG. 1), the bearings and the swing unit will be caused to rotate in a counterclockwise direction causing the arms 45 and the tube 46 to swing forwardly (as viewed in FIG. 1) to assume the broken line position $c$ of FIG. 7, with the model assuming the downwardly inclined pitch angle of broken line position $c$ of FIG. 7. Because of the ability to move the model supporting mechanism and the model vertically as desired, the model and bearing or pitch axis may be selectively positioned anywhere along the vertical center line $y$ by simply raising or lowering the entire model supporting mechanism by means of the actuating cylinder 41 so that surveys or tests can be taken anywhere along the vertical span or height of the air stream from the top to the bottom thereof, and which also enables the model to be inserted into or withdrawn from the air stream at any pitch angle from either the top or bottom of the air stream.

Because of the ability to independently rotate the model about the pitch axis and to independently raise and lower the model vertically, the vertical disposition and pitch angle of the model may be changed independently or simultaneously as desired to assemble data on the effect of such changes on the model. Thus, ($a$) the pitch of the model may be changed and the model then moved vertically across the air stream or ($b$) the model may be moved vertically to a desired spot and then pitched to the desired angle or ($c$) the pitch of the model may be changed simultaneously with the vertical movement across the air stream. This combination of simultaneous movements permits preselection of any pitch points along the longitudinal axis of the model by programmed combinative vertical and pitching movement. This enables the model to be pitched about any point along its longitudinal axis with a single mounting without changing that mounting or the sting. Were this combination of movements not available, this pre-selection of different axial pitch points would not be possible, and the model would have to be mounted on a new sting each time it was desired to pitch about another pitch point relative to the model, which changing of stings is both very expensive and very time consuming. The model may also be independently rotated about its longitudinal axis which is always in alignment with the horizontal centerline X of the swing bearings by means of the roll mechanism or sting during these changes in pitch and/or vertical disposition so that any combination of movements and positions involving pitch, roll or vertical movement may be simulated and tested.

It is important to note that all of the structure comprising the model supporting mechanism S1, with the exception of the upper portion of the narrow strut 47 is disposed outside the path of the air stream at all times and is not subjected to the intense pressures and temperatures of said air streams and provides a minimum of structure in the path of the air stream so that there is a minimum of interference with the flow pattern of the air stream.

The instrumentation for recording data can be located in the tube 46 quite close to the model M while still remaining outside the path of the air stream. The vertical mobility of the supporting mechanism and the model, in addition to providing the various movements desired of the model with respect to the air stream, also permits the model and supporting mechanism to be lowered to an out of the way position such as shown in the broken line position of FIG. 1 to enable the model and the supporting mechanism to be worked upon without danger to the operator who, when standing on the platform 55, is entirely outside the path of the air stream. In the broken line configuration of FIG. 1, the clamping collar 48 has been loosened and the strut 47 and the model have been rotated relative to the tube 46 to lower the same to a position which is more readily accessible and convenient to the attendant standing on the platform, the ability of the strut 47 to be rotated relative to the tube 46 thereby materially shortening the distance which the supporting mechanism must be lowered to enable the operator to attend the model without being in the path of the air stream and thereby permitting a more compact plenum chamber of smaller diameter to be used than would otherwise be the case if the lowering of the model had to be entirely accomplished by the downward movement of the supporting mechanism only. The large concentric openings of the bearing supports, bearings and swing arms enable the model to be readily viewed from the sides during testing, and the separable plenum sections enable the plenum chamber to be quickly exhausted to permit an attendant to enter said chamber shortly after the test run has been completed.

Figure 4:
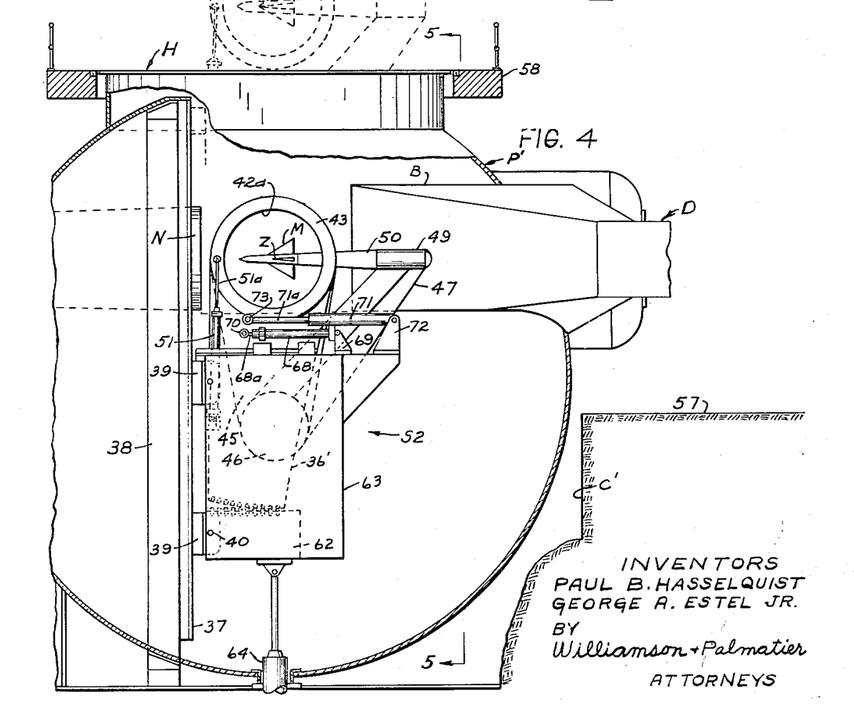
FIG. 4 is a side elevational view with portions broken away of another assembly utilizing a hatched spherical plenum chamber and another form of model supporting means of our invention.
Figure 6:
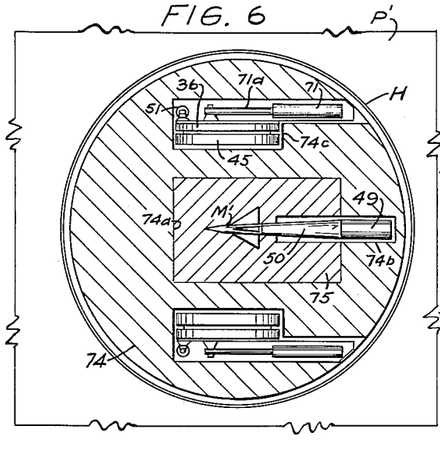
FIG. 6 is a partial top plan view of the assembly of FIG. 4 with the model and supporting mechanism therefor in raised exposed position.

FIGS. 4–6 illustrate an alternate form of our invention utilizing a plenum P' of different design and another form of model supporting mechanism S2, which modification enables the model to have not only all of the movements provided by the model supporting mechanism S1 previously described, that is, pitch, roll and vertical movement, but also provides for the additional linear movement of the model along a horizontal axis extending longitudinally of the air stream.

In the form of our invention shown in FIGS. 4 through 6, the plenum P' is of generally integral spherical design, and is provided with a large hatch opening surrounded by a hatch collar H at the top thereof, permitting the model to be raised and lowered therethrough. The sphere may be partially sunk or located in a cavity C' extending below the test room floor 57, with the top of the hatch being in substantial horizontal alignment with the floor 58 of the model room. This spherical design permits a shorter plenum than the cylindrical plenum P but requires somewhat greater height. Therefore, the particular plenum chamber design can be selected which best fits the space requirements of the structure which is to house the wind tunnel assembly.

This assembly of FIGS. 4–6 also has the nozzle N from which the air is discharged into the plenum chamber, the bell mouth B communicating with a diffuser D and the free jet area F therebetween in which the model is located during testing. The hatch is provided with a hatch cover 59 which is provided with rollers 60 which ride on guide rails 61 so that the hatch cover may be rolled back and forth from closed sealed position on the plenum to an out of the way open position on the model room floor. The model supporting mechanism S2 shown in FIGS. 4–6 is similar in most respects to the supporting mechanism S1 shown in FIGS. 1 through 3, but has, in addition thereto, structure providing the longitudinal axial translation of the model in the air stream. The supporting mechanism S2 includes an elevator unit adapted for vertical reciprocation which includes an elongate transverse supporting base member 62 which spans the air stream and interconnects and supports the upstanding vertical elevator side members 63. The elevator unit just described is mounted for guided vertical movement on vertical guide rails 37 corresponding to those previously described by means of similar slides or runner members 39 interconnecting the guide rails and the elevator sides 63, with the guided vertical movement of the elevator unit being supplied by the model support actuating cylinder 64 which is similar to the actuating cylinder 41 previously described except that it has a longer stroke, of necessity, to enable the model support mechanism and the model to be raised into the exposed position above the plenum hatch as shown by the broken line position of FIG. 4.

The elevator unit supports and carries the model support mechanism S1 previously described, including the swing supporting unit including cross member 35, bearing supports 36' (which are the same as bearing support members 36 except for the modification noted hereinafter), bearings 42, and the swing unit including the arms 45, tube 46 and strut 47 with certain modifications hereinafter to be described, whereby the swing supporting unit is converted into a rockable cradle unit to provide the desired axial translation of the model. Supporting mechanism S2 also has the large concentric openings in the bearings, bearing supports and swing arms for unobstructed viewing of the model, and the model is again mounted on the axis of rotation Z of the bearings for simultaneous rotation thereof about common pitch axis Z. The same roll mechanism is also provided for rotating the model about its longitudinal axis.

Thus, the swing unit of the model supporting mechanism is the same in both S1 and S2 and functions in precisely the same manner to enable the bearings and the model to be pivoted or rotated about the common pitch axis Z, located at the intersection of the vertical center line $y$ and the horizontal center line $x$ of the bearings. This form of support mechanism is also provided with angle of attack cylinders 51 for rotating the bearings relative to the bearing supports and causing corresponding pivotal movement or change of pitch of the model in the air stream. The model supporting mechanism S2 differs from S1 primarily in providing for linear axial translation of the model lengthwise of the air stream. This axial translation is accomplished by converting the swing supporting unit into a rockable cradle unit whereby the rocking motion thereof, and particularly of the bearing supporting members 36' accomplishes the movement in a manner hereinafter to be described.

To accomplish this axial translation by rocking the bearing support members 36, the lower marginal ends 65 of the bearing supports 36' are semi-circular and formed on a radius $r$ having as its origin or axis the bearing or pitch axis Z. This curved portion 65 is adapted to engage or rest upon the flat top surface 62$a$ of the elevator base 62 and to be rocked back and forth thereon. Suitable means are preferably provided to prevent slippage between the curved surfaces 65 and the top surface 62$a$. In the form shown in the drawings, these means consist of a longitudinal series of upstanding teeth or lugs 66 provided on the top 62$a$ of the base 62 and directly beneath and in alignment with the curved bottom portions 65, each of the semi-circular edges having a circumferentially spaced series of depressions or sockets 67 formed therein adapted to successively receive and mate with the lugs 66 as the bearing supports are rocked back and forth, the lugs mating with the sockets and preventing any relative slippage between the curved portions 65 and the top of the base 62.

To provide the rocking movement of the cradle unit and bearing support members 36', a horizontally disposed rock actuating cylinder 68 is provided, the outer end of the cylinder being mounted on the top of the elevator sides 63 by means of mounting brackets 69, the outer end of the connecting rod 68$a$ being secured to the outer face of the bearing support members 36' as at 70. Thus, by actuating the rock cylinder 68 and its connecting rod 68$a$, the bearing support members 36' and all of the mechanism carried thereby including the swing unit and the model are caused to be rocked back and forth on the elevator base 62. Because the curved rocking surfaces 65 are formed on a radius having as its axis or point of origin the pitch axis, the rocking motion of the bearing supports 36' provides linear motion of the model along its longitudinal axis and lengthwise of the air stream and corresponding linear translation of the pitch axis Z along the same path of travel. This movement is best illustrated in FIG. 8, in which the solid line position shows the bearing support members 36' and the model (and swing unit carrying same) in its normal position as shown in FIG. 4 disposed entirely in the free jet space or area. The broken line position of FIG. 8 shows the relative positions of the members after the bearing support members have been rocked rearwardly or upstream by actuation of the rock cylinder to move the model closer to or into the nozzle itself. Stop means or mechanism such as the cylinder 71 may be provided to control the limit of movement of the bearing support members 36' when they are rocked, the outer end of the cylinder 71 being mounted atop the elevator sides 63 by means of the mounting bracket 72, the outer end of the connecting rod 71a being connected to the face of the bearing support member as at 73.

It will be noted that the plenum P' is also provided with side observation ports 29 whose horizontal center line corresponds with the air stream center line and which are in alignment with and concentrically disposed with respect to the large center openings in the bearings to enable the model to be freely viewed and photographed when being tested.

In the assembly shown in FIGS. 4 to 6, the model may be raised entirely out of the plenum chamber through the hatch opening so that an attendant need not enter the plenum chamber at all to attend to the model.

The hatch opening is provided with permanent flooring 74 to support an attendant when the model and its supporting mechanism are in raised exposed position. The flooring 74 is provided with a central cut-out portion 74a and a forwardly extending cut-out slot 74b communicating therewith to enable the model and its supporting strut to be raised and lowered through the permanent flooring 74. Temporary flooring 75 is provided which is adapted to fit into the center cut-out 74a when the model and its supporting strut have been raised above the permanent flooring to enable the attendant to stand directly next to the model, which temporary flooring 75 is removed prior to the model and the supporting strut being lowered into the plenum chamber. The permanent flooring 74 is also provided with laterally spaced cut-out portions 74c to permit the bearing support members 36', the bearings and the swing arms 45 to be also raised through the permanent flooring.

From the foregoing description, it will be appreciated that the model support mechanism S2 provides all of the model movements and positions capable of being accomplished by the support mechanism S1 hereinbefore described in detail, and in addition thereto is capable of the additional movement of axial translation of the model and the pitch axis Z longitudinally of the air stream to permit surveys to be taken longitudinally of the air stream as well as vertically.

Thus, the model supporting mechanism S2 provides four separate individual types of movement for the model, which may be accomplished separately, simultaneously or in any combination thereof. Thus, the pitch of the model may be varied by pivoting the model about the bearing or pitch axis Z by actuating the angle of attack cylinders 51, the model may be raised or lowered vertically throughout the vertical span of the air stream by operation of the model support actuating cylinder 64, the model may be moved or translated horizontally along its longitudinal axis and longitudinally of the air stream by operation of the rock cylinder 68, and the model may be rotated around its longitudinal axis by means of the roll mechanism 50. It will be recognized that the translation of the pitch axis Z longitudinally of the air stream in no way interferes with the ability of the model to be pitched about said axis Z, and that the model may be rotated about said axis anywhere along the longitudinal span of the air stream in the test area.

In operation of the assembly shown in FIGS. 4–6, the supporting mechanism S2 is initially in raised exposed position above the hatch, as shown by the broken line position of FIG. 4, with the hatch cover removed and the temporary flooring in place. When the model has been properly mounted or installed on the strut 47, the temporary flooring is removed, and the supporting mechanism S2 and model are lowered into the plenum chamber to a position beneath the path of the air stream so that no mechanism will be present in the air stream before it is stabilized. The hatch cover is then rolled into place and secured. The tunnel is then turned on and the air stream is permitted to become stabilized, after which the model is raised into the air stream transversely thereof, and the testing thereof is accomplished in any manner desired by utilizing or taking advantage of the various multiple movements and positionings of the model as hereinbefore described. When the testing has been accomplished, the air stream is shut off, the hatch cover is removed, the model and its supporting mechanism are raised out of the plenum chamber, the temporary flooring is put in place and the model is serviced, completely outside the plenum chamber.

It is important to note that in the assembly of FIGS. 4–6, as in the assembly shown in FIGS. 1–3, all of the supporting mechanism and relatively movable elements for accomplishing the desired movements of the model, with the exception of the upper end portion of the strut 47 are disposed outside of the air stream.

FIGS. 9 and 10 illustrate somewhat diagrammatically another alternate form of model supporting mechanism S3 of our invention. S3 utilizes the swing feature of S1 and S2 to accomplished the pitching of the model, but employs different means for moving the model into and out of the air stream. The model supporting mechanism S3 comprises a supporting base 76 which spans the air stream and which supports thereon a pair of laterally spaced apart upstanding bearing support members 77 which support at their upper ends rotatable bearing members 78. These bearings carry and are integrally connected to a pair of depending swing arms 79 which are interconnected at their lower ends by means of a seat or cross member 80. An upstanding forwardly inclined model supporting strut 81 carrying the usual sting 50 and the model M on its upper end is mounted on the cross member 80, at its lower end for rotation of said strut about a horizontal axis V—V which parallels the length of the air stream to enable the strut and the model carried thereon to be tilted or swung laterally into and out of the path of the air stream, the retracted position being shown in broken line in FIG. 10. The actuation of the strut and the model is accomplished by means of a laterally extending strut actuating cylinder 82, the outer end of the cylinder being suspended from the cross member 80 by means of the mounting bracket 83, the outer end of its connecting rod 82a being drivingly connected to a depending off-set strut actuating arm 84 which is off-set with respect to the strut 81.

Thus, when the model is in raised test position as shown by the solid line position of FIG. 10, the off-set actuating arm 84 is offset with respect to the vertical and the connecting rod 82a is in extended position. By retracting the connecting rod, the strut and model are swung or tilted to the retracted broken line position of FIG. 10, the off-set actuating arm 84 then assuming a substantially vertical position. An instrumentation or pressure transducer housing 85 is also provided which is suspended from the cross member 80. In this arrangement, the model is also positioned on the axis of rotation Z of the bearing so that the model and bearing have a common axis of rotation. The pitch of the model may be varied as desired by swinging the swing unit by any suitable means. It will be further recognized that the form of our invention shown in FIGS.

9 and 10 can be modified according to the teachings set forth hereinbefore with regards to the forms of supporting mechanism S1 and S2 in that the bearing support members may be enlarged and the bearing centers can also be enlarged so that the center portion of the bearing is open to permit complete viewing of the model from the side during testing.

The supporting mechanism of FIGS. 9 and 10 can be incorporated in any suitable plenum chamber having the usual nozzle and bell mouth and means for providing and disposing of a jet air stream.

This form of our inveniton has particular applicability where space requirements are quite limited or where the vertical and/or horizontal axial translation provided by S1 and S2 are not necessary or desired. However, it will be recognized that the laterally tiltable strut and laterally swinging model movement of our invention as shown in FIGS. 9 and 10 can be readily incorporated into the supporting units S1 and S2 so as to include either vertical movement or horizontal axial translation or both if desired.

In the supporting mechanism S3, it is again important to note that all of the supporting structure and moving parts with the exception of the upper portion of the strut 81 are located outside of the path of the air stream as in the other forms of supporting mechanism of our invention. This form of our invention has the advantage that it eliminates the necessity for the vertical movement and yet still provides for moving the model into and out of the air stream transversely thereof so that the air stream flow can be stabilized before injecting the model into the air stream and still permits the pitch angle to be varied as desired in the same manner as in the other forms of our invention previously hereinbefore described by simply swinging the model supporting swing unit either forwards or backwards.

Figure 11:
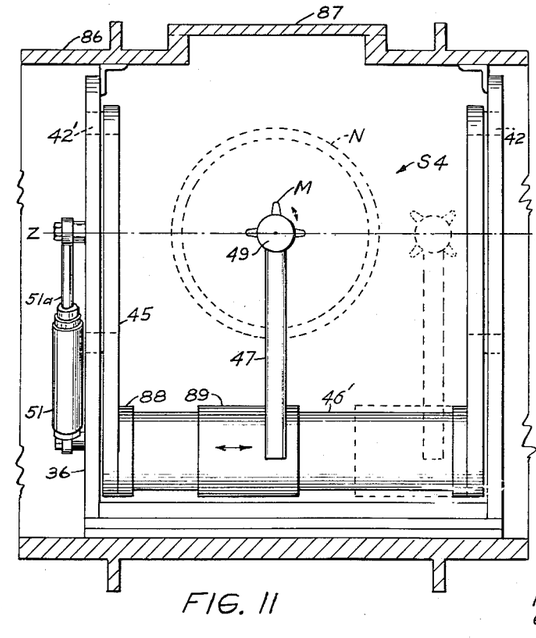
FIG. 11 is a front elevational view on an enlarged scale of another alternate form of model supporting mechanism of our invention.
Figure 12:
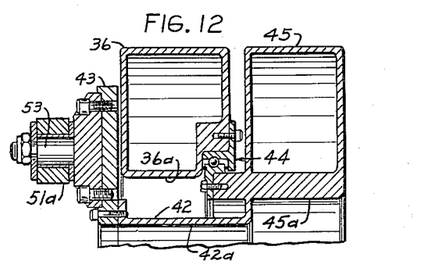
FIG. 12 is a detailed sectional view on an enlarged scale taken on the line 12—12 of FIG. 2.
Figure 13:
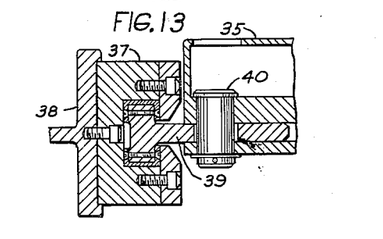
FIG. 13 is a detailed sectional view on an enlarged scale taken on the line 13—13 of FIG. 1.

FIG. 11 illustrates still another alternate form of model support S4 of our invention. As in the form of model support S3 shown in FIGS. 9 and 10, the support S4 has particular applicability in those situations where only limited space requirements are available and where the vertical and horizontal axial translation provided by support units S1 and S2 are either unnecessary or undesirable. Support unit S4 utilizes the swing feature to accomplish the change in pitch of the model, but provides for laterally reciprocating the model into and out of the air stream as an alternate to the vertical movement of units S1 and S2 and the tilting movement of S3.

The assembly shown in FIG. 11 includes plenum shell structure 86 defining and enclosing the plenum chamber test area and having a covered opening 87 or observation port disposed directly above the model test area. A main supporting base 88 is provided on the floor of the plenum chamber which has mounted thereon a pair of laterally spaced apart upstanding previously described bearing support members 36 which have large circular openings therein adjacent the upper end portions thereof in which are journaled large circular bearings 42′ having large central openings therein to expose the model being tested to full view from either side, the bearings 42′ being the same as the previously described bearings 42 except for the elimination of the annular turning flange 43 of bearing 42. The bearings 42′ carry and are integrally connected to the usual depending swing arms or struts 45 which are in turn interconnected at their lower ends by means of seat member comprising the cylindrical tube 46′ for housing the roll actuator and instrumentation such as the transducers. This cylindrical tube may be a removable canister which is temperature controlled and seated in the sockets or collars 88 carried by the lower ends of the arms 45. The tube 46′ has co-axially mounted thereon a slidable strut mounting collar 89 which carries the usual upstanding forwardly inclined model supporting strut 47, which in turn has mounted thereon the sting 50 and the model M which is again mounted so as to have a common axis of rotation with the bearings. The model supporting swing unit which includes the bearings, depending arms and cylindrical tube is rotated or swung about the axis of rotation of the bearing Z—Z (which is also the pitch axis of the model) by means of the previously mentioned angle of attack cylinder 51, the outer end of which is mounted on the outer face of one of the bearing support members 36, the connecting rod 51a of which has its outer end drivingly connected directly to the outer end of the bearing 42′ instead of the flange 43 as in S1 and S2, so that actuation of the connecting rod by the cylinder causes the bearings to be rotated either clockwise or counterclockwise as desired, thereby causing the tube 46′ carrying the model supporting strut to be swung forwardly or rearwardly about the pitch axis to effect a pivotal motion of the model about the pitch axis Z—Z to selectively change the pitch or angle of attack of the model as desired. The nozzle exit is indicated in the dotted outline and defines the general cross sectional area of the path of the air stream. The collar 89 may be reciprocated laterally back and forth along the length of the tube 46′ by any suitable means to move the model between the solid line operational test position and a retracted position out of the air stream such as to the position indicated by the broken lines of FIG. 11. When in such retracted position, the model may, if desired, be rolled through approximately 45° of movement about its longitudinal axis as shown in the broken line position of FIG. 11 to insure more complete retraction and lack of exposure of the model to the effects of the air stream.

In this form of our invention, as in the other forms hereinbefore described, all of the model supporting mechanism including the movable joints which effect the movement of the model, with the exception of the top portion of the strut 47 are disposed outside the path of the air stream. Also, the model may be moved selectively and laterally into and out of the air stream as desired and the pitch angle can be varied as desired, in the manner hereinbefore described.

It will be appreciated that the novel feature of laterally shifting or reciprocating the strut and model on the instrumentation tube to selectively move the model horizontally across the width of the air stream and laterally into and out of said air stream can be readily incorporated into either support unit S1 or S2 where vertical and/or axial translation is also desired.

Figure 15:
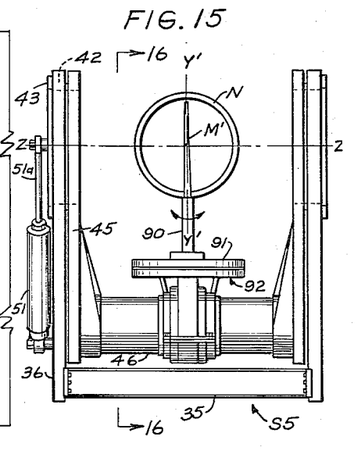
FIG. 15 is a front elevational view of still another form of model mounting mechanism of our invention.
Figure 16:
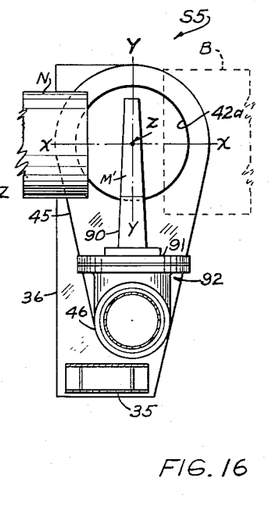
FIG. 16 is a side sectional view taken along the line 16—16 of FIG. 15.

FIGS. 15 and 16 illustrate still another modification of our invention in which the model support S5 is so designed that the yaw as well as the pitch of the model may be varied while in the air stream to provide an innumerable number of pitch and yaw combinations which can be tested. The model support mechanism S5 illustrated in FIGS. 15 and 16 is similar in all respects to the model support S1 except for the means utilized to mount the model on the seat portion of the swing unit, and includes the supporting base 35, the bearing supports 36, the large open centered circular bearings 42 rotatably journalled in the bearing supports and carrying the swing arms 45 which are interconnected by the cylindrical tube 46. However, in model support S5 the model supporting strut 47 previously described has been replaced by a revolving pedestal 90 upon which the model M′ is vertically mounted, the model in these circumstances being sometimes referred to as a floor mounted model, the pedestal in turn being mounted on a turntable 91. The turntable is mounted on the cross tube 46 for rotation about a generally vertical axis by suitable mounting mechanism clamped thereon and indicated generally by 92. In this particular form of our invention the model is again centered on the axis of rotation Z—Z of the bearing, which axis again serves as the pitch axis about which the model is rotated by swinging movement of the tube 46 accomplished by rotating the bearings as hereinbefore described to provide a variety of pitch angles. The revolving pedestal enables the model to be rotated, pivoted or swung from side to side in the air stream about a normally generally vertical axis Y'—Y' normal to the and intersecting the pitch axis Z—Z and tube 46 and corresponding to the longitudinal axis of the model M' in FIGS. 15 and 16 and in parallel alignment with bearing center line Y—Y, and referred to as the yaw axis, so that the yaw of the model may be varied as desired. Thus, the pitch and yaw may be independently or simultaneously varied as desired to permit a large variation of pitch and yaw combinations to be tested in the air stream.

It will be recognized that it is within the scope of this invention to incorporate the revolving model carrying pedestal of S5 in either of the support assemblies S1 or S2 in order to permit changing of yaw or pitch, but also to provide vertical and/or horizontal axial translation of the model where desired.

In addition, it will be further recognized that the pedestal 90 of S5 may be replaced by the previously described strut 47 so that the strut 47 is carried by the turntable 91 instead of the pedestal, and the model is disposed as in S1 and S2 with the longitudinal axis of the model normally horizontally disposed lengthwise of the air stream rather than generally vertically disposed as in S5 and transverse to the air stream, the turntable thereby providing for changing the yaw (which is not provided for in S1 and S2 as illustrated) in addition to pitch, roll, vertical movement and axial translation.

From the foregoing description, the advantages of our invention are readily apparent. The model support of our invention, regardless of which one of the forms illustrated herein is employed, enables the model to be readily moved into and out of the air stream so that the air stream flow can be stabilized before the model is injected therein. This ability to selectively position the model in or out of the air stream also enables the model to be serviced out of the path of the air stream to avoid hazardous servicing conditions.

Furthermore, the model support mechanism of our invention provides means for positioning the model at any desired angle in the air stream and at any particular point in that air stream as well as multiple directional movement through said air stream so that almost any conceivable type of test or survey can be run with the wind tunnel of our invention. Thus, a model support may be selected according to our invention which will accomplish one or more or all of the following movements, namely, (1) Change in pitch (up and down swinging movement); (2) change in yaw (side to side swinging movement); (3) vertical movement through, into and out of the air stream; (4) transverse linear horizontal movement throughout the span or cross section of the air stream and into and out thereof; (5) rolling of the model about its longitudinal axis in the air stream; (6) axial translation of the model and pitch axis along the length of the air stream; and (7) sideways tilting of the model, through, into and out of the air stream.

The novel design of the model supports of our invention also place or position all of the model supporting mechanism and mechanical joints accomplishing the movements of the model outside of the air stream during testing and place a minimum of supporting structure in the path of the air stream so as not to upset the flow patterns of the air stream.

Also, our novel supporting mechanism also enables the model being tested to be readily viewed from both sides or from above without interference. The novel wind tunnel assemblies illustrated include the respective model supports and plenum chamber combinations which we have shown also have significant advantages. In the cylindrical separable-sectional form of FIG. 1, the sections may be quickly clamped and unclamped and quickly separated to quickly exhaust the heat and gases from the interior of the plenum chamber to make servicing operations on the model much more agreeable than in devices of the prior art in which the operator must enter a test chamber which cannot be conveniently exhausted or which requires expensive exhaust equipment to be employed in combination with the test chamber. The spherical type of plenum chamber of FIG. 4 again provides desirable servicing conditions in that the operator need not enter the plenum chamber at all but can service and attend to the model completely outside the test chamber since the model and supporting mechanism therefor are capable of being raised entirely outside of the plenum chamber.

It will be noted that for the sake of consistency and clarity of understanding the horizontal transverse axis Z has been referred to as the pitch axis, regardless of the type of model illustrated or the manner in which it is mounted. However, it is recognized that the labels "pitch" and "yaw" may be applied to different axes according to the type of and manner of mounting of any particular model. Thus, the pitch and yaw axes referred to herein with regards to model M' shown in FIGS. 15 and 16 would be reversely labeled by some persons because the longitudinal axis of the model is normally vertically disposed rather than horizontally as in the other illustrations.

It will be further recognized and understood that our invention is not limited to the use of our novel model supporting mechanisms with the particular test chambers or plenum chambers disclosed and described herein, and that any of the model supporting mechanisms of our invention may be utilized with any type of suitably designed test chamber desired.

It will be further recognized and understood that our invention is not limited to the specific forms of the model supporting mechanisms shown in the accompanying drawings and described hereinbefore, but includes within its scope any combination of the desirable features and structure incorporated in any one of the forms of the invention illustrated.

It will, of course, be understood that various changes may be made in the form, detail, arrangement and proportion of the parts without departing from the scope of our invention which consists of the matter described herein and set forth in the appended claims.

What we claim is:

1. In a wind tunnel assembly including means for directing an air stream along a predetermined path of travel, model supporting means adapted to maintain a model in said air stream on a test axis normal to said air stream, said supporting means including a swingable member disposed outside said air stream generally transversely thereof and swingable about said test axis, means for mounting said model on said swingable member to enable said model to also pivot about said test axis in response to the swinging movement of said member about said axis, bearing means disposed outside said air stream and co-axial with said test axis, said bearing means having a large open center through which the model can be viewed, and means interconnecting said swingable member and said bearing means for swinging movement of said member about said axis.

2. The apparatus set forth in claim 1 including bearing supporting means having a semi-circular edge portion formed on a radius of said axis and adapted for rolling movement on a planar supporting surface in a direction parallel to said air stream to effect linear translation of the bearing means, model and test axis longitudinally of said air stream.

3. In a wind tunnel assembly including means for directing an air stream along a predetermined path of travel, model supporting means for maintaining a model on a test axis normal to said air stream, said model supporting means including a swingable member disposed outside said air stream and generally transversely thereof, strut means mounted on said member and adapted to have a model mounted thereon for disposition in said air stream on said axis, bearing means disposed outside said air stream and concentric with said test axis, and means interconnecting said bearing means and said transverse member for simultaneous rotation of said transverse member and said model about said test axis.

4. The apparatus set forth in claim 3, including bearing supporting means also disposed outside the path of said air stream and comprising a part of said model supporting means, said model supporting means described being adapted for movement as a unit in a direction normal to said air stream to selectively move said model into and out of the path of said air stream.

5. The apparatus set forth in claim 3 wherein said strut member is movable relative to said transverse member to enable the model carried thereon to be selectively moved into and out of the path of said air stream.

6. The apparatus set forth in claim 3, wherein the model supporting strut is adapted for reciprocating movement on said transverse member in a direction normal to said air stream to permit said model to be moved laterally into and out of said air stream.

7. The apparatus set forth in claim 3 wherein the strut member is adapted for rotation about an axis disposed outside of said air stream and generally longitudinally disposed with respect to said air stream to permit said model to be rotated about said axis for swinging movement of said model into and out of said air stream generally laterally thereof.

8. The apparatus set forth in claim 3 wherein said strut means is mounted on a rotatable member which is mounted on said transverse member and adapted to independently rotate the strut and the model carried thereon about a second axis normal to said first-named axis.

9. The apparatus set forth in claim 3 including bearing supporting means adapted for rocking movement in a direction generally parallel to said air stream on a curved portion thereof formed on a radius having as its axis said test axis and adapted to rock back and forth on a planar supporting surface to move said model, test axis and bearing means longitudinally of said air stream along a linear path of movement.

10. The apparatus of claim 3 wherein said bearing means has a large central opening which permits viewing of said model completely while on said test axis in said air stream from a position outside said model supporting means.

11. In a wind tunnel assembly including means for directing an air stream along a predetermined path of travel, model supporting mechanism including a swing unit disposed entirely outside said air stream and including a transverse member spanning said air stream and spaced apart side arms interconnected by said transverse member, a model supporting strut carried by said transverse member and adapted to support a model in said air stream on a test axis normal to said air stream, said side arms being supported by circular bearing means for rotation about said test axis, said bearing means having a large central opening therein to permit substantially complete viewing of the model therethrough when in the test stream, and bearing supporting means disposed also outside said air stream and also adapted to permit free viewing of the model through said opening in said bearing.

12. The model supporting mechanism set forth in claim 11 including reciprocating means interconnected with said bearing supporting means for moving said model supporting mechanism as a unit in a direction of movement normal to said air stream to selectively move said model into and out of said air stream generally laterally thereof.

13. The apparatus set forth in claim 11 wherein said model supporting mechanism is mounted for guided vertical travel as a unit, and reciprocating means drivingly interconnected with said bearing supporting means for selectively reciprocating said model supporting means as a unit for selectively moving said model vertically into and out of said air stream.

14. The apparatus of claim 11 wherein said bearing supporting means consists of a rockable cradle unit having a semi-circular portion thereof which is formed on a radius having as its origin said test axis and adapted for rolling and rocking movement on a supporting planar surface in a direction generally parallel to the path of travel of said air stream, a rocking movement of said bearing supporting means causing translation of said model, bearing and test axis linearly and longitudinally of said air stream to selectively position the model along a plurality of longitudinally spaced points in said air stream.

15. The apparatus set forth in claim 14, wherein said model supporting mechanism including said rockable cradle unit for supporting the bearings is movable vertically in guided fashion as a unit, and means interconnected with said cradle unit for effecting vertical reciprocating movement of said model supporting unit to thereby cause said model to be moved vertically into and out of said air stream.

16. The apparatus of claim 11 wherein said model supporting strut is selectively rotatable about said supporting transverse member upon which it is mounted.

17. The apparatus of claim 11 wherein said model supporting strut is adapted for reciprocating movement on said transverse member in a direction normal to said air stream to selectively move said model laterally into, out of and through said air stream.

18. The apparatus of claim 11 wherein said model supporting strut is rotatably mounted on said transverse member for independent rotation about an axis generally parallel to said air stream for swinging movement of said model supported thereby into and out of said air stream generally laterally thereof.

19. The apparatus set forth in claim 11 including roll mechanism carried by said strut for rotating an elongate model mounted thereon about the longitudinal axis of said model.

20. The apparatus set forth in claim 11 including means for rotatably mounting said strut on said transverse member for rotatable movement of said model about an axis normal to said test axis and said air stream.

21. The apparatus set forth in claim 14 wherein said semicircular portion and said planar surface are provided with cooperating means for preventing relative sliding movement therebetween.

22. The apparatus set forth in claim 14 wherein said semicircular portion and said planar surface are provided with cooperating teeth and socket means for preventing relative sliding movement therebetween.

23. In a wind tunnel assembly including means for directing an air stream along a predetermined path of travel, model supporting means including a swing unit having a seat portion spanning said air stream transversely thereof and elongate spaced apart arm portions interconnected at one end by said seat portion, the other end portions of which are provided with circular bearings adapted for rotation about a test axis normal to said air stream, said bearings having large central portions generally concentric with said test axis for viewing a model therethrough, a strut member mounted on said seat member and extending generally upward therefrom, the upper end of said strut member having mounted thereon a model adapted for rotation about said test axis, said bearing members being supported by bearing supporting members having a large circular opening in which said bearings are journaled, and bearing turning means interconnected with the outer end portions of said bearings and adapted to thereby rotate said bearings to effect corresponding swinging movement of said swinging unit and thereby causing pitching movement of said model about said test axis.

24. The apparatus set forth in claim 23 wherein the seat is tubular in nature.

25. In a wind tunnel assembly, annular plenum structure providing a plenum chamber, said structure including separable plenum sections movable towards and away from each other to quickly exhaust the contents of the chamber and provide access to the interior thereof, means for directing an air stream through said chamber along a predetermined path of travel, model supporting means including a swing unit disposed entirely outside said air stream, said swing unit including a seat portion which spans said air stream and interconnects one end portion of swingable spaced apart seat supporting members disposed on opposite sides of said air stream, means for supporting the other end portions of said members for rotation about a test axis passing through said air stream and normal thereto, upstanding strut means mounted on said seat portion and adapted to carry and maintain a model in said air stream on said test axis for rotation thereabout in response to the swinging movement of said swing unit about said axis, means for reciprocating said model supporting means as an integral unit to move the model carried thereby between a test position in said air stream and a servicing position outside said air stream and within said chamber, and platform means for supporting an attendant entering said chamber in a position adjacent said model in servicing position, said attendant when so positioned being out of the path of said air stream.

26. The wind tunnel assembly of claim 25 wherein that portion of the model supporting mechanism located on said test axis is provided with a large opening along said axis to permit viewing of said model in said air stream along said test axis.

27. The wind tunnel assembly of claim 25 wherein said means for supporting the other end portions of said seat supporting members includes elongate elements having their first end portions interconnected with said swing members for rotation of said swing about said test axis, said elements having second semi-circular end portions formed on a radius whose point of origin corresponds to said test axis, element supporting means providing a planar surface for supportingly engaging said semi-circular portions for rocking movement of said portions thereon, and reciprocating means for rocking said elements on said element supporting means in a direction parallel to the path of travel of said air stream to rock said elements and model supporting means carried thereon and thereby linearly translate said model and said test axis longitudinally in and of said air stream.

28. The wind tunnel assembly set forth in claim 27, and means for vertically raising and lowering said element supporting means to selectively move said model into and out of said air stream.

29. In a wind tunnel assembly, structure providing a plenum chamber, said chamber having an opening and removable cover therefor in the top of said chamber, means for directing an air stream through said chamber along a predetermined path of generally horizontal travel, model supporting means including a swing unit disposed entirely outside said air stream, said swing unit including a seat portion which is disposed beneath and spans said air stream and interconnects spaced apart upstanding swingable seat supporting members disposed on opposite sides of said air stream, means for supporting said members for rotation about a test axis passing through said air stream and normal thereto, upstanding strut means mounted on said seat portion and adapted to carry and maintain a model in said air stream on said test axis for rotation thereabout in response to the swinging movement of said swing unit about said axis, and means for reciprocating said model supporting means as an integral unit vertically to move the model carried thereby between a test position in said air stream and a servicing position above said opening in said chamber.

30. The assembly set forth in claim 29 wherein said member supporting means includes upstanding elements having their upper end portions interconnected with said swing members for rotation of said swing about said test axis, said elements having semicircular lower edge portions formed on a radius whose point of origin corresponds to said test axis, element supporting means providing a horizontal planar surface for supportingly engaging said semi-circular portions for rocking movement of said portions and their respective upstanding elements thereon, and reciprocating means for rocking said elements on said element supporting means to rock said elements and model supporting means carried thereon and linearly translate said model and said test axis longitudinally in and of said air stream.

31. In a wind tunnel assembly including means for directing an air stream along a generally horizontal path of travel, model supporting means comprising a supporting base normally beneath said air stream and spanning same and carrying at opposite ends thereof upstanding bearing support members, rotatable bearing members journaled in and supporting by said members for rotation about a test axis normally to said air stream, a swing unit connected with said bearings for simultaneous rotation therewith including swing arms depending from said bearings and a seat portion spanning said air stream therebeneath and interconnecting said arms, an upstanding strut mounted on said seat portion and adapted to carry a model on the upper end thereof and maintain said model on said test axis for simultaneous rotation of said model, swing unit, and bearings about said axis, actuating means for turning said bearings to effect said simultaneous rotation, and means for raising and lowering said supporting base for moving said model into and out of said air stream.

32. The assembly of claim 31, wherein said supporting base and bearing support members constitute a rockable cradle unit which includes a semi-circular lower rocker portion, a second supporting base providing a planar supporting surface for said rocker portion, said raising and lowering means being interconnected with said second supporting base for raising and lowering the model supporting means as an entirety to move said model into and out of said air stream, and reciprocating means for rocking said cradle unit back and forth on its supporting base and thereby translating the test axis, bearings and model longitudinally of the air stream.

33. In model testing apparatus including means providing an air stream directed along a predetermined path of travel, model supporting means adapted to maintain a model in said air stream on a test axis normal to said air stream, said supporting means including swingable means located outside said air stream and adapted for swinging movement about said test axis and means for mounting said model on said swingable means to enable said model to pivot about said test axis in response to the swinging movement of said swingable means, structure located outside said air stream and pivotally supporting said swingable means for rotation thereof about said axis, and means for moving said structure to translate said test axis and model longitudinally of said air stream while maintaining the same relative rotational relationship between said model and said swingable means, said structure including a member pivotally interconnected with said swingable means for swinging movement of said swingable means relative to said member, the axis of relative swinging movement between said swingable means and said member corresponding to said test axis, said member having a curved portion formed on a radius of said test axis, said curved portion being supported by a planar surface and adapted to be rolled on said surface longitudinally of said air stream, said rolling movement effecting said translation of said test axis longitudinally of the air stream.

34. In a wind tunnel assembly including means for directing an air stream along a predetermined path of travel, model supporting means for maintaining a model on a test axis normal to said air stream, said model supporting means including a swingable member disposed outside said air stream and generally transversely thereof, strut means mounted on said member and adapted to have a model mounted thereon for disposition in said air stream on said axis, circular bearing means disposed outside said air stream and concentric with said test axis, and means interconnecting said bearing means and said transverse member for simultaneous rotation of said transverse member and said model about said test axis.

35. The apparatus of claim 34 wherein said bearing means has a large central opening which permits viewing of said model completely while on said test axis in said air stream from a position outside said model supporting means.

References Cited in the file of this patent

UNITED STATES PATENTS

| | | |
|---|---|---|
| 1,710,135 | Zahm | Apr. 23, 1929 |
| 2,219,161 | Jacobs | Oct. 22, 1940 |
| 2,612,776 | Klas | Oct. 7, 1952 |
| 2,700,305 | Kendall | Jan 25, 1955 |
| 2,791,905 | Cheney | May 14, 1957 |

OTHER REFERENCES

Aviation, July, 1945, pages 155–157. Article by Millikan.